United States Patent [19]
Palson et al.

[11] Patent Number: 5,139,799
[45] Date of Patent: Aug. 18, 1992

[54] ULTRA-SONIC REMOVAL OF XANTHINES FROM COCOA BEANS

[75] Inventors: Albert S. Palson; Deonaraine Singh, both of Pinawa; Sivaraman Vijayan, Deep River, all of Canada

[73] Assignee: Nestec S.A., Vevey, Switzerland

[21] Appl. No.: 693,378

[22] Filed: Apr. 30, 1991

[51] Int. Cl.$^5$ ............................................. A23G 1/00
[52] U.S. Cl. ................................... 426/238; 426/427; 426/431
[58] Field of Search ...................... 426/238, 427, 431

[56] References Cited

U.S. PATENT DOCUMENTS

| | | | |
|---|---|---|---|
| 4,390,698 | 6/1983 | Chiovini et al. | 426/431 |
| 4,407,834 | 10/1983 | Chiovini et al. | 426/427 |
| 4,444,798 | 4/1984 | Magnolate et al. | 426/427 |
| 4,861,607 | 8/1989 | Margolis et al. | 426/427 |

FOREIGN PATENT DOCUMENTS

| | | |
|---|---|---|
| 1101944 | 10/1955 | France . |
| 2459001 | 1/1981 | France . |
| 2-222671 | 9/1990 | Japan ................................ 426/238 |
| 714133 | 8/1954 | United Kingdom . |

OTHER PUBLICATIONS

Thompson et al., "Ultrasonic Isonation Effect on Liquid-Solid Extraction, " Industrial and Engineering Chemistry, vol. 47, No. 6, pp. 1167–1168.
Chendke et al., "Macrosonics in Industry, 4 Chemical Processing," Ultrasonics, vol. 13, pp. 31–37.
Flisak et al., "The Influence of Ultrasonics on Liquid–Liquid Extraction", Ultrasonics, vol.
Translation of Japanese Kokai No. H2-222671 Sep. 1990.

Primary Examiner—George Yeung
Attorney, Agent, or Firm—Vogt & O'Donnell

[57] ABSTRACT

Xanthine compounds are removed from cocoa beans by subjecting a mixture of a cocoa bean feedstock and a xanthine leachant to ultrasonic radiation.

10 Claims, No Drawings

ULTRA-SONIC REMOVAL OF XANTHINES FROM COCOA BEANS

BACKGROUND OF THE INVENTION

The present invention relates to a process for the removal of xanthines from cocoa beans.

In recent years, the need has arisen to remove xanthines such as caffeine and theobromine from cocoa beans for the production of consumer products prepared from cocoa beans, owing to their undesirable stimulant and diuretic properties. The differences in physico-chemical properties between caffeine and theobromine make the separation of these two compounds from cocoa beans relatively complex. For instance, typical concentration levels of theobromine in cocoa beans vary from 5 to 13 times greater than that of caffeine and, in terms of solubility in water, theobromine requires 40 times more water than caffeine. Consequently, an economical process to remove both the caffeine and theobromine is more difficult than the removal of caffeine alone from cocoa beans.

Conventional processes for the liquid leaching of cocoa beans with water as the leaching fluid using mechanical agitation can remove in excess of 97% xanthines provided that the contact time between the cocoa solids and the leachant is sufficient, usually at least 2 hours. However, the handling and processing of the slurry produced as a result of the leaching pose severe processing problems (e.g., the separation of feedstock and extract, xanthine removal from the extract, etc.).

French patent No. 2459001 describes a process for decaffeinating coffee beans in which the coffee beans are suspended in a liquid and the suspension is irradiated by ultrasonics of frequency in the range of 13 to 100 kHz with sufficient energy to cause cavitation. However, the maximum decaffeination level disclosed is only 80% and there is no mention of cocoa or theobromine.

SUMMARY OF THE INVENTION

We have now devised a process for the removal of xanthines from cocoa beans by means of ultrasonic leaching by which it is possible to remove over 97% of the xanthines in less than half the time used in conventional leaching methods.

Accordingly, the present invention provides a process for the removal of xanthines from cocoa beans which comprises treating a mixture of a cocoa bean feedstock and a leachant with ultrasonic radiation.

DETAILED DESCRIPTION OF THE INVENTION

The cocoa bean feedstock is preferably deshelled unground broken cocoa nibs or deshelled ground cocoa nibs, preferably with a small particle size. The particle size may vary from less than 2mm for ground nibs to a size of from about 5 to 15 mm long and from about 2 to 5 mm wide for broken nibs.

The leachant may be a food-acceptable liquid in which the xanthines are soluble, for example, water or dilute aqueous solutions of polyvinyl alcohol (e.g., 2–10 wt%) or sodium hydroxide (e.g. 0.005 to 0.02 M). However, distilled water is preferred because of its abundance and its compatibility for human consumption and, in addition, its use simplifies the processing steps when compared with a sodium hydroxide solution.

The temperature of the process may be from 20° to 100° C., preferably 40° to 90° C. and especially from 45° to 85° C.

The ratio of the cocoa bean feedstock to the leachant may be, for instance, from 1:2 to 1:50, but preferably from 1:5 to 1:33, by weight.

The duration of the leaching may vary widely and may be, for example, from 5 minutes to 100 hours, preferably from 15 minutes to 20 hours and especially from 30 minutes to 6 hours.

The power density of the ultrasonic radiation may produce cavitation, and is conveniently greater than 47 watts/cm$^2$, preferably from 59 to 118 watts/cm$^2$. The frequency of the ultrasonic radiation is preferably from 10 kHz to 100 kHz and especially from 25 kHz to 100 kHz.

Advantageously, to subject the mixture of the cocoa bean feedstock and leachant to ultrasonic radiation, an ultrasonic probe is inserted in the mixture of cocoa bean feedstock and leachant, and irradiation is carried out continuously or intermittently.

The leaching process may be single-stage or multi-stage. In a multi-stage process, after each stage of leaching, the pulp that is formed is separated e.g.; by filtration, and the cocoa solids removed are mixed with further fresh leachant and the leaching continued. In a multi-stage process, typically, the number of stages is from 2 to 8 and preferably from 4 to 6.

EXAMPLES

The following Examples further illustrate the present invention.

All the Examples were carried out using an apparatus comprising the following components:

1. An ultrasonic generator (Model ARTEK Systems Corporation Model 150) with a maximum power rating of 150 watts at 20 kHz. The ultrasonic horn was made up of a titanium tip of 127 mm diameter (cross-sectional area = 1.266 cm$^2$). At maximum power, the generator provided a power density of 118 watts/cm$^2$.

2. A Haake G.Thermostat, containing water, controls temperature of feed slurry (cocoa nibs + water) at the desired temperature, within 0.1° C.

3. A leaching vessel consisting of a cylindrical polypropylene bottle with a lid having an opening for inserting the ultrasonic probe.

EXAMPLE 1

25 g of deshelled unground cocoa nibs were weighed into the leaching vessel, and 200 ml of distilled water preheated to 80° C. were added.

The leaching vessel containing the solid-liquid mixture was placed in the thermostat where the temperature of 80° C. was maintained. At this point, the ultrasonic probe was inserted into the leaching vessel and the generator power turned on to 100%. The leaching of xanthines from the nibs into the water was carried out for five periods of 8 minutes each in a multi-stage process where, after each stage of leaching, the pulp was filtered, and the cocoa solids removed from the filtered pulp were added with a further 200 ml of fresh distilled water and the leaching continued. After a total contact time of 40 minutes, the amount of xanthines removed from the cocoa nibs was greater than 97wt%.

EXAMPLE 2

A similar procedure to that described in Example 1 was followed except that the leaching was carried out in six stages of equal duration where the total contact time was 50 minutes. The amount of xanthines removed from the cocoa nibs was greater than 97 wt%.

EXAMPLE 3

A similar procedure to that described in Example 1 was followed except that the leaching was carried out in four stages of equal duration where the total contact time was 30 minutes. The amount of xanthines removed from the cocoa nibs was about 97wt%.

EXAMPLE 4

A similar procedure to that described in Example 1 was followed except that 825 ml of distilled water were used, and the leaching was carried out in one stage over 60 minutes. The amount of xanthines removed from the cocoa nibs was about 97wt%.

EXAMPLES 5 TO 18

25 g samples of deshelled unground cocoa nibs were weighed into the leaching vessel, and appropriate amounts of distilled water preheated to a desired temperature were added. The cocoa feedstock initially contained on average 1397 mg/100 g of theobromine and 156 mg/100 g of caffeine.

The leaching vessel containing the solid-liquid mixture was placed in the thermostat where the temperature was maintained. The ultrasonic probe was inserted into the leaching vessel and the generator power turned on to 100%. The amounts of water, the temperature, the number of stages and the amounts of theobromine and caffeine removed are given in the following Table I.

As a comparison, a 4-stage ultrasonic leaching process was carried out in a leaching vessel under the same conditions as above but without agitating the leaching vessel. After 60 minutes, the amount of theobromine removed was 1332:9 mg/100 g cocoa nib. This is a factor of at least two less then the time required using conventional leaching methods.

We claim:

1. A process for the removal of xanthines from cocoa beans comprising subjecting a mixture of a cocoa bean feedstock and a leachant to ultrasonic radiation so that at least 97% of an amount of xanthine compounds contained in the feedstock are leached from the feedstock into the leachant and separating leachant containing the xanthine compounds from the feedstock.

2. A process according to claim 1 wherein the cocoa bean feedstock is nibs, the leachant is distilled water in a ratio of nibs to water of from 1:2 to 1:50 by weight and the temperature of the mixture is from 40° C. to 90° C.

3. A process according to claim 1 wherein leachant containing xanthine compounds is separated from the feedstock from 2 to 8 times and fresh leachant is mixed with the feedstock from 1 to 7 times and each mixture of fresh leachant and feedstock is subjected to the ultrasonic radiation.

4. A process according to claim 3 wherein the feedstock is deshelled nibs, the leachant is distilled water in a ratio of nibs to water from 1:2 to 1:50 by weight and the temperature of the feedstock is from 40° C. to 90° C.

5. A process according to claim 1 wherein the ratio of the feedstock to the leachant is from 1:5 to 1:33 by weight.

TABLE I

| Example | Duration mins | Feed Condition (nibs) | Temp °C. | Qty of Solvent per Stage | Solid/ Liquid Ratio Per Stage | No of Stages | Total Qty of Solvent mls | Overall Xanthine removal mg Xanthine Removed 100 g Feed Theobromine | Caffeine |
|---|---|---|---|---|---|---|---|---|---|
| 5 | 270 | unsoaked | 55 | 200 | ~1:8 | 6 | 1200 | 1190 | 109 |
| 6 | 150 | unsoaked | 80 | 200 | ~1:8 | 7 | 1400 | 1415 | 139 |
| 7 | 180 | unsoaked | 55 | 200 | ~1:3 | 5 | 1000 | 1153 | 119 |
| 8 | 60 | unsoaked | 80 | 200 | ~1:8 | 6 | 1200 | 1439 | 133 |
| 9 | 120 | unsoaked | 65 | 200 | ~1:8 | 7 | 1400 | 1248 | 113 |
| 10 | 120 | unsoaked | 80 | 400 | ~1:33 | 1 | 400 | 1238 | 153 |
| 11 | 120 | unsoaked | 65 | 400 | ~1:33 | 1 | 400 | 1267 | 129 |
| 12 | 180 | unsoaked | 55 | 200 | ~1:3 | 5 | 1000 | 1442 | 125 |
| 13 | 120 | unsoaked | 80 | 80 | ~1:8 | 7 | 1400 | 1562 | 177 |
| 14 | 270 | nitrogen treated | 55 | 200 | ~1:8 | 6 | 1200 | 1285 | 145 |
| 15 | 20 | unsoaked | 80 | 200 | ~1:8 | 6 | 1200 | 1059 | 96 |
| 16 | 30 | unsoaked | 80 | 200 | ~1:8 | 6 | 1200 | 1262 | 115 |
| 17 | 40 | unsoaked | 80 | 200 | ~1:8 | 6 | 1200 | 1342 | 124 |
| 18 | 50 | unsoaked | 80 | 200 | ~1:8 | 6 | 1200 | 1393 | 129 |

COMPARATIVE EXAMPLE

A conventional 4-stage leaching process was carried out wherein 25 g of deshelled underground unsoaked cocoa nibs were placed in a container and mixed with 200 ml distilled water per stage at 80° C. The contents of the container were agitated at a rate of 80 oscillations per minute. Each stage lasted 30 minutes. The amounts of theobromine removed are given in Table II.

TABLE II

| Time from start (mins) | Wt. of theobromine removed (mg/100 g Cocoa Nib) |
|---|---|
| 30 | 769 |
| 60 | 1080 |
| 90 | 1234 |
| 120 | 1307 |

6. A process according to claim 3 wherein the ratio of the feedstock to the leachant is from 1:5 to 1:33 by weight.

7. A process according to claim 1 wherein the energy of the ultrasonic radiation is sufficient to produce cavitation.

8. A process according to claim 3 wherein the energy of the ultrasonic radiation is sufficient to produce cavitation.

9. A process according to claim 1 wherein the energy and frequency of the ultrasonic radiation are from 47 to 118 watts/cm$^2$ and from 10 to 100 kHz.

10. A process according to claim 3 wherein the energy and frequency of the ultrasonic radiation are from 47 to 118 watts/cm$^2$ and from 10 to 100 kHz.

* * * * *

UNITED STATES PATENT AND TRADEMARK OFFICE
CERTIFICATE OF CORRECTION

PATENT NO. : 5,139,799
DATED : August 18, 1992
INVENTOR(S) : Albert Sigtryggur PALSON, et al.

It is certified that error appears in the above-identified patent and that said Letters Patent is hereby corrected as shown below:

Column 1, line 50, delete "treating" and insert therefor --subjecting--.

Column 4, line 28 [line 3 of claim 4], after "water" and before "from" insert --of--.

Signed and Sealed this

Twenty-first Day of September, 1993

Attest:

BRUCE LEHMAN

Attesting Officer

Commissioner of Patents and Trademarks